(12) United States Patent
Glazer et al.

(10) Patent No.: US 8,757,663 B1
(45) Date of Patent: Jun. 24, 2014

(54) OUTRIGGER FOR A BOOM TRUCK OR THE LIKE

(71) Applicants: James M. Glazer, Omaha, NE (US); Dean H. Smith, Eagle, NE (US)

(72) Inventors: James M. Glazer, Omaha, NE (US); Dean H. Smith, Eagle, NE (US)

(73) Assignee: Westchester Capital LLC, Omaha, NE (US)

( * ) Notice: Subject to any disclaimer, the term of this patent is extended or adjusted under 35 U.S.C. 154(b) by 0 days.

(21) Appl. No.: 13/871,141

(22) Filed: Apr. 26, 2013

(51) Int. Cl.
*B60S 9/12* (2006.01)
(52) U.S. Cl.
USPC .................................. 280/766.1; 280/763.1
(58) Field of Classification Search
CPC ........................................................ B60S 9/02
USPC ..................... 180/766.1, 763.1, 764.1, 765.1
See application file for complete search history.

(56) References Cited

U.S. PATENT DOCUMENTS

| | | | | |
|---|---|---|---|---|
| 1,852,436 A | * | 4/1932 | Robinson | 280/763.1 |
| 3,262,582 A | | 7/1966 | Pitman et al. | |
| 3,310,181 A | | 3/1967 | Symmank | |
| 3,438,509 A | | 4/1969 | Munz | |
| 3,545,635 A | * | 12/1970 | Montan | 280/763.1 |
| 3,716,252 A | | 2/1973 | Johnson | |
| 3,784,035 A | * | 1/1974 | Dunbar | 414/543 |
| 3,871,383 A | * | 3/1975 | Lee | 607/34 |
| 3,871,685 A | | 3/1975 | Senelet | |
| 3,953,052 A | * | 4/1976 | Palmcrantz | 280/763.1 |
| 5,335,891 A | | 8/1994 | Gilbert | |
| 5,387,071 A | | 2/1995 | Pinkston | |
| 6,840,540 B2 | * | 1/2005 | Fugel | 280/763.1 |
| 7,150,472 B1 | | 12/2006 | Schneider | |
| 7,328,810 B1 | * | 2/2008 | Rhodes | 212/180 |
| 7,331,607 B1 | | 2/2008 | Schneider | |
| 7,552,828 B2 | * | 6/2009 | Fugel | 280/766.1 |
| 7,594,679 B1 | * | 9/2009 | Schneider | 280/766.1 |
| 8,087,473 B2 | * | 1/2012 | Osadchuk et al. | 173/1 |

* cited by examiner

*Primary Examiner* — Hau Phan
(74) *Attorney, Agent, or Firm* — Dennis L. Thomte; Thomte Patent Law Office LLC

(57) ABSTRACT

An outrigger including a horizontally disposed two-stage outrigger assembly and a vertically disposed two-stage outrigger assembly extending downwardly from the outer end of the horizontally disposed two-stage outrigger assembly.

5 Claims, 5 Drawing Sheets

OUTRIGGER FOR A BOOM TRUCK OR THE LIKE

BACKGROUND OF THE INVENTION

1. Field of the Invention

This invention relates to an outrigger for a boom truck or the like and more particularly to an outrigger for use on a vehicle having an aerial device associated therewith. Even more particularly, this invention relates to an outrigger including a two-stage horizontally disposed outrigger assembly having a vertically disposed two-stage outrigger assembly secured to the outer end thereof.

2. Description of the Related Art

Many types of outriggers or stabilizers have been previously provided for boom trucks, utility trucks, cranes, aerial devices, or the like. The outriggers of the prior art normally have a horizontally disposed outrigger assembly of the single-stage type and a vertically disposed outrigger assembly of the single-stage type extending downwardly from the outer end of the horizontally disposed outrigger assembly. The horizontally disposed single-stage outrigger assemblies of the prior art include a stationary, horizontally disposed, outer tubular member having a selectively extendable and retractable inner tubular member telescopically slidably mounted therein. The conventional horizontally disposed single-stage outrigger assembly has a limited horizontal extension. In large aerial devices which have a boom length of well over one hundred feet, it is critical to have the ground engaging pads of the outrigger spaced considerably outwardly of the truck or vehicle. Further, the vertically disposed single-stage outrigger assemblies cannot adequately position the ground engaging pads thereon when the ground level at the side of the vehicle is below the vehicle.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An outrigger is disclosed for use with a vehicle having a forward end, a rearward end, a first side and a second side. A first outrigger assembly is mounted on the vehicle rearwardly of the forward end thereof at the first side thereof. The first outrigger assembly comprises a first horizontally disposed and elongated tubular member having inner and outer ends which is operatively secured to the vehicle. A second horizontally disposed and elongated tubular member, having inner and outer ends, is telescopically slidably mounted in the first tubular member and is movable between retracted and extended positions with respect to the first tubular member. A third horizontally disposed and elongated tubular member, having inner and outer ends, is telescopically slidably mounted in the second tubular member and is movable between retracted and extended positions with respect to the second tubular member. A fourth vertically disposed and elongated tubular member, having upper and lower ends, has its upper end secured to the outer end of the third tubular member. A fifth vertically disposed and elongated tubular member, having upper and lower ends, is telescopically slidably mounted in the fourth tubular member and is movable between retracted and extended positions with respect to the fourth tubular member. A sixth vertically disposed and elongated tubular member, having upper and lower ends, is telescopically slidably mounted in the fifth tubular member and is movable between retracted and extended positions with respect to the fifth tubular member. A ground engaging pad is secured to the lower end of the sixth tubular member. Means is provided for selectively moving the second, third, fifth and sixth tubular members between their retracted and extended positions.

A second outrigger assembly is secured to the second side of the vehicle and is identical to the first outrigger assembly. Preferably, a third outrigger assembly is secured to the vehicle at the first side thereof rearwardly of the first outrigger assembly. The third outrigger assembly is identical to the first and second outrigger assemblies. A fourth outrigger assembly is secured to the vehicle at the second side thereof rearwardly of the second outrigger assembly. The fourth outrigger assembly is identical to the first, second and third outrigger assemblies.

It is therefore a principal object of the invention to provide an outrigger for a boom truck, utility truck, crane, aerial device, etc.

A further object of the invention is to provide an outrigger which includes a horizontally disposed two-stage outrigger portion and a vertically disposed two-stage outrigger assembly.

A further object of the invention is to provide an outrigger of the type described which provides stability to a vehicle having an aerial device mounted thereon.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
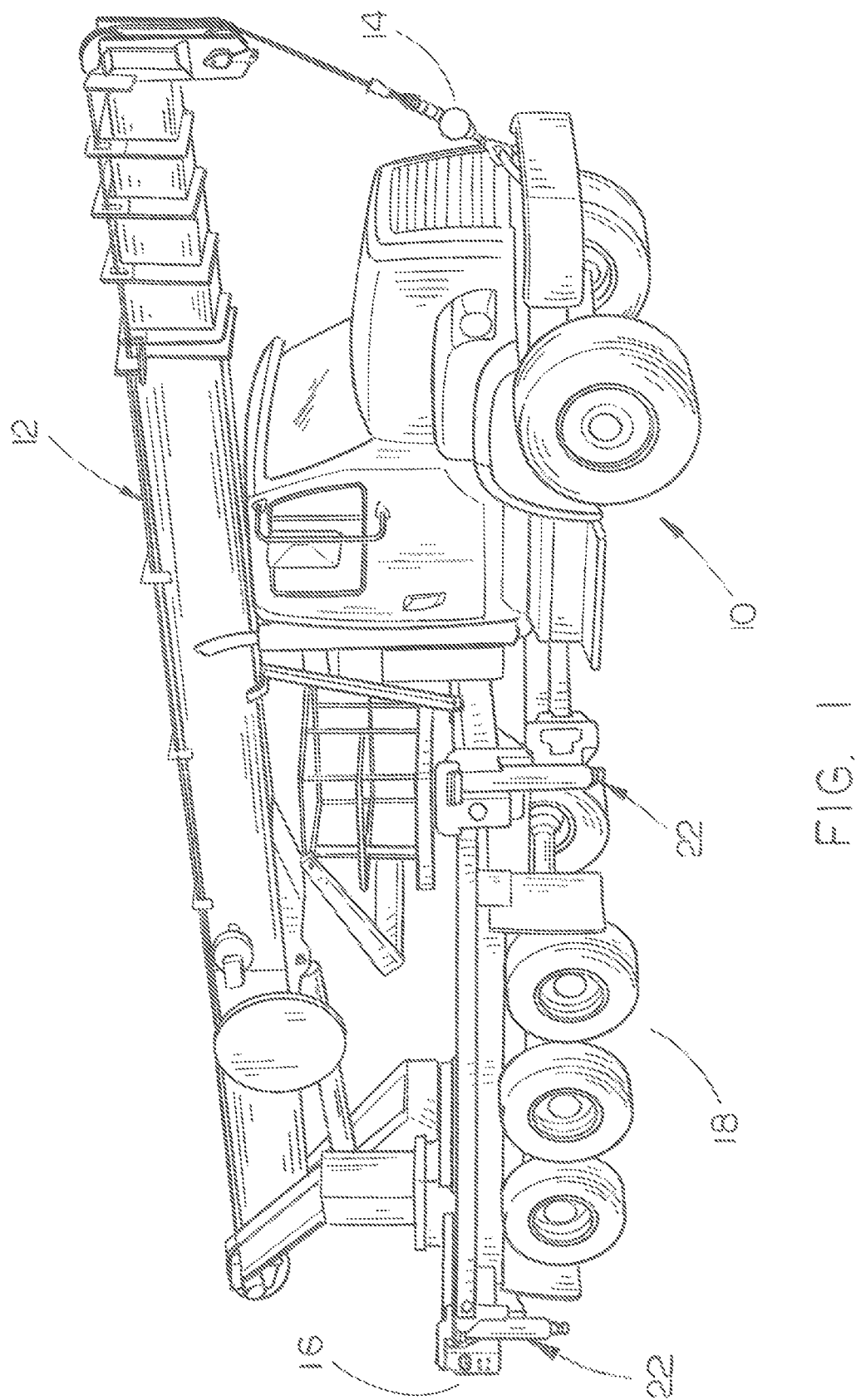
FIG. 1 is a front perspective view of a vehicle such as a truck or the like having an aerial device mounted thereon and which has a plurality of the outriggers of this invention mounted thereon.
Figure 2:
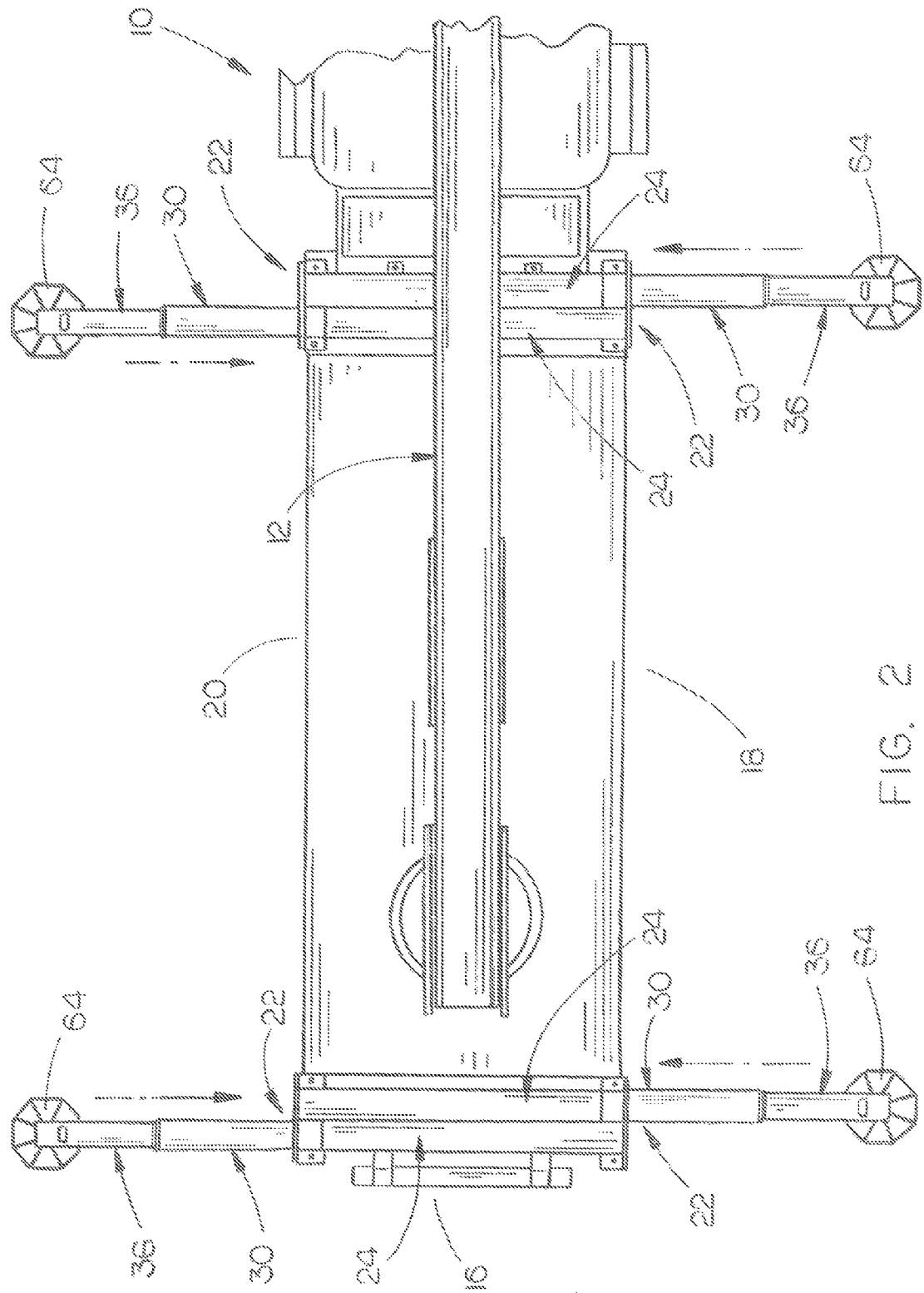
FIG. 2 is a partial top view illustrating four outriggers of this invention secured to the vehicle.
Figure 3:
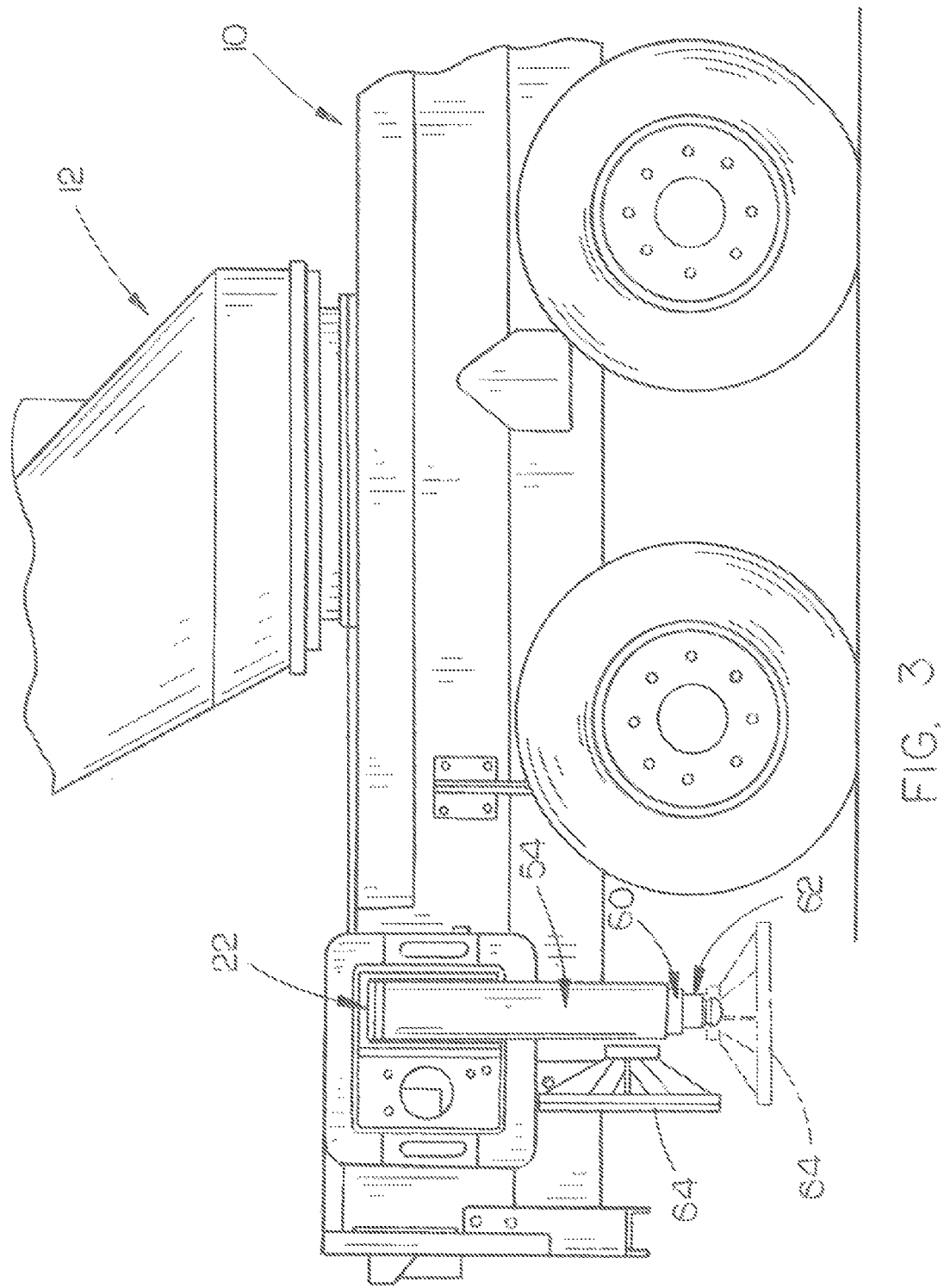
FIG. 3 is a partial side view illustrating one of the outriggers of this invention in the retracted position with the broken lines illustrating the manner in which a pad is secured to the outrigger.
Figure 4:
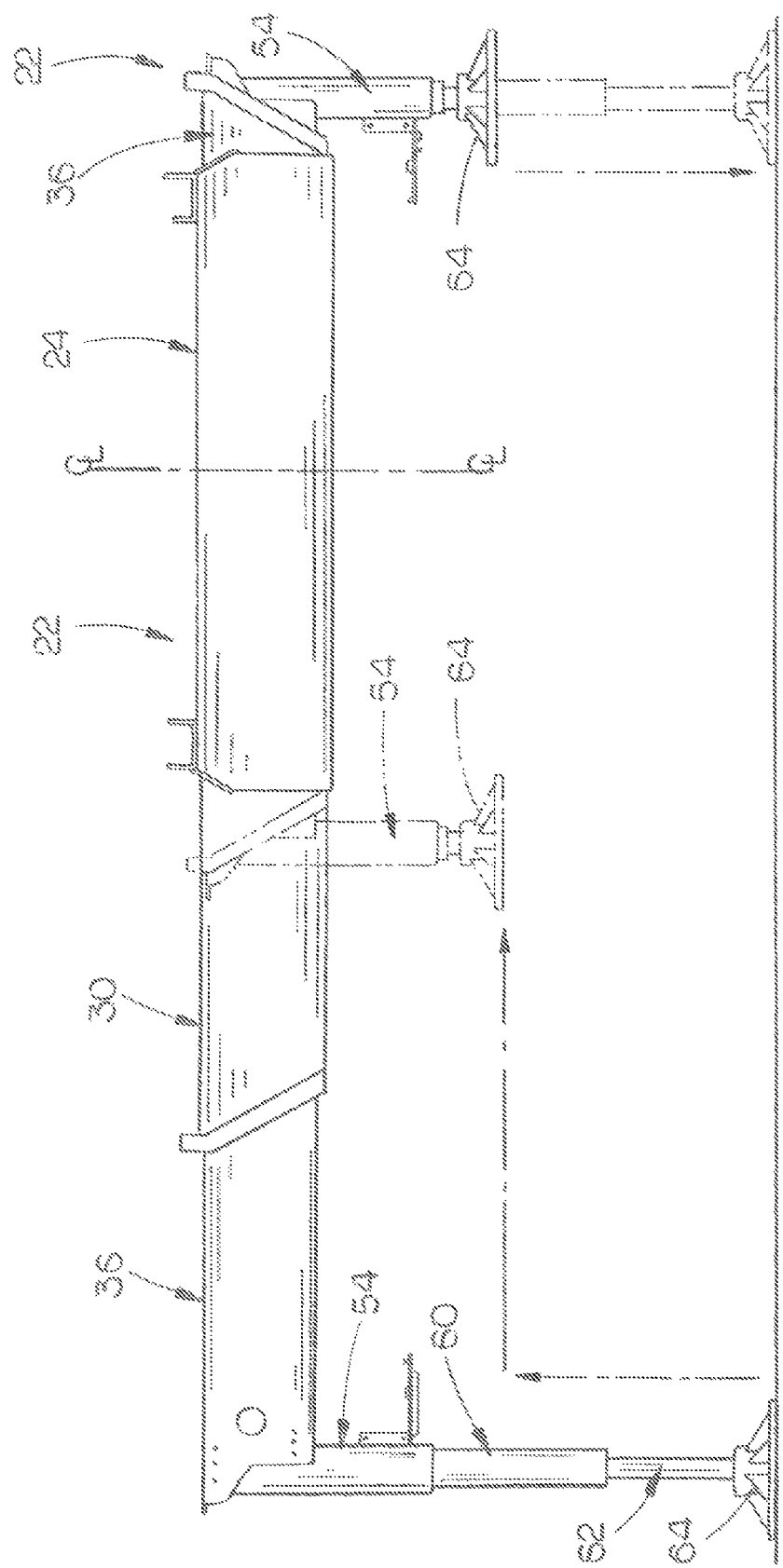
FIG. 4 is an end view illustrating a pair of outriggers of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a vehicle such as a truck or the like which is adapted to have a telescopic boom 12 mounted thereon. For purposes of description, vehicle 10 will be described as having a forward end 14, a rearward end 16, a first side 18 and a second side 20.

The numeral 22 refers to the outrigger assembly of this invention. Preferably, two of the outrigger assemblies 22 are mounted at each side of the vehicle as seen in the drawings but a single outrigger assembly 22 could be mounted at each side of the vehicle, inasmuch as the four outrigger assemblies shown in the drawings are identical, only a single outrigger assembly 22 will be described in detail.

Outrigger assembly 22 includes a first horizontally disposed and elongated tubular member 24 having an inner end 26 and an outer end 28. Tubular member 24 is secured to the vehicle 10 so as to be transversely disposed with respect to the longitudinal axis of the vehicle. A second horizontally disposed and elongated tubular member 30 is telescopically slidably mounted in tubular member 24 and has an inner end 32 and an outer end 34. Tubular member 30 is slidably movable between retracted and extended positions with respect to tubular member 24. A third horizontally disposed and elongated tubular member 36 is telescopically slidably mounted in tubular member 30 and has an inner end 38 and an outer end 40. Tubular member 36 is slidably movable between retracted and extended positions with respect to tubular member 30.

Figure 5:
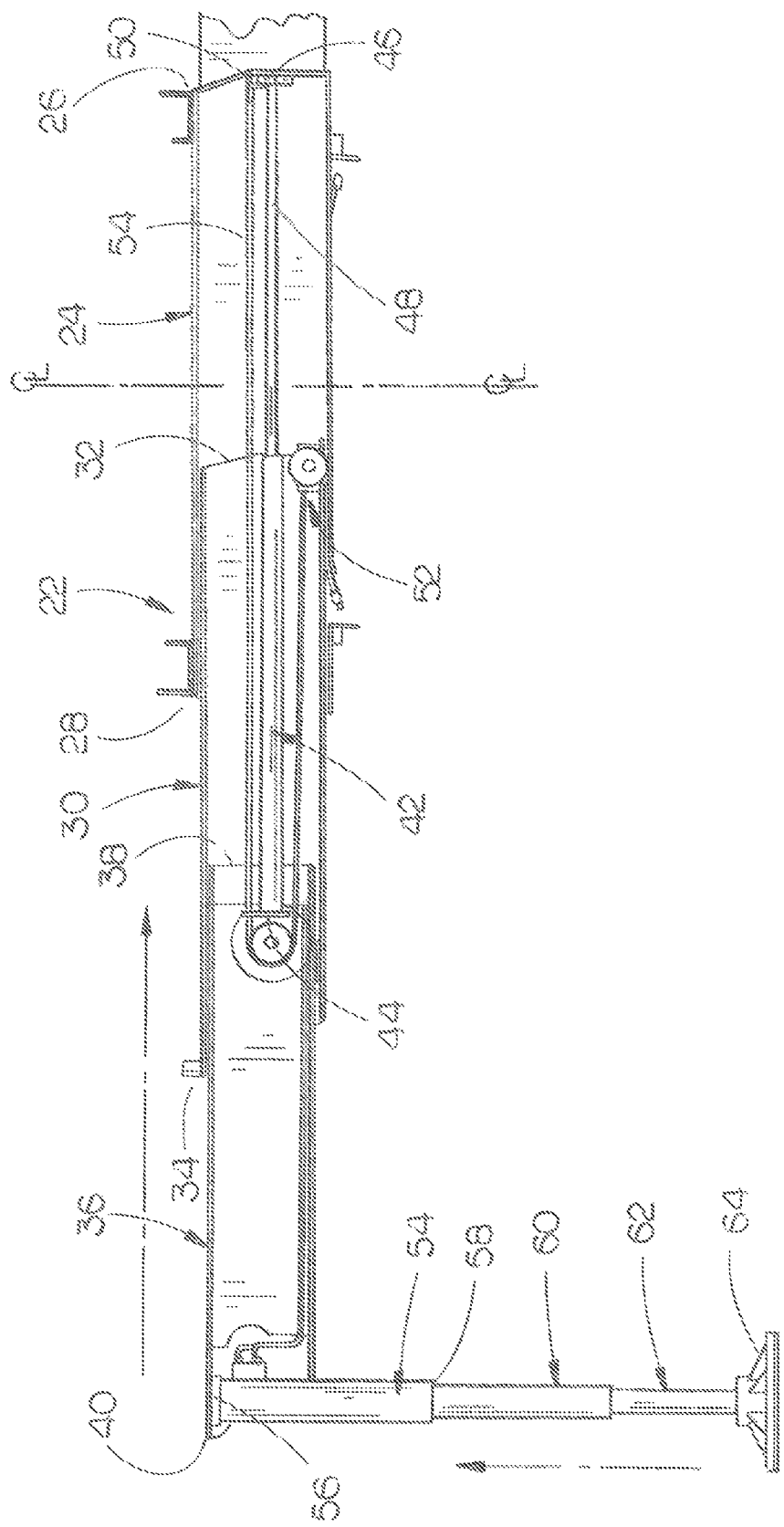
FIG. 5 is a sectional view illustrating components of the outrigger of this invention.

One means for extending and retraction for the tubular members 30 and 36 is shown in FIG. 5. A double-acting hydraulic cylinder 42 has its base end 44 secured to the inner end of tubular member 36. The end 46 of cylinder rod 48 is secured to the inner end of tubular member 24 and 50. The numeral 52 refers generally for a sheave and cable apparatus for supporting the hydraulic hose or hoses for the hydraulic cylinder 42. If desired, the base end 44 of hydraulic cylinder 42 could be secured to the inner end of tubular member 24 with the end 46 of cylinder rod 48 being secured to the inner end of tubular member 36. In either case, the extension of cylinder rod 48 from the hydraulic cylinder 42 causes the extension of tubular members 32 and 36 with respect to tubular member 24 and the retraction of cylinder rod 48 into hydraulic cylinder 42 causes the retraction of tubular members 30 and 36.

The numeral 54 refers to an elongated, vertically disposed tubular member having an upper end 56 and a lower end 58. Tubular member 54 is secured, at its upper end, to the outer end of tubular member 36. An elongated, vertically disposed tubular member 60 is slidably telescopically mounted in tubular member 54. Tubular member 60 is slidably movable between extended and retracted positions. An elongated, vertically disposed tubular member 62 is slidably telescopically mounted in tubular member 62. Tubular members 60 and 62 are slidably movable between extended and retraction positions by a hydraulic cylinder or cylinders mounted with tubular member 54. A pad 64 is selectively removably secured to the lower end of the tubular member 62.

The horizontally disposed two-stage outrigger assemblies enable the pads 64 on the opposite sides of the vehicle to be spaced farther apart than is possible with single-stage outriggers. The wide spacing of the pads 64 provides greater stability to the vehicle. The vertically disposed two-stage outrigger assembly of the outrigger 22 enables the pads 64 to be securely positioned on the ground at the side of the vehicle when the ground level is below the vehicle.

Thus it can be seen that the invention accomplishes at least all of staged objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. An outrigger for a vehicle having a forward end, a rearward end, a first side and a second side, comprising:
   a first outrigger assembly mounted on the vehicle rearwardly of said forward end thereof at said first side thereof;
   said first outrigger assembly comprising:
   (a) a horizontally disposed and elongated first tubular member, having inner and outer ends, operatively secured to the vehicle so as to be transversely disposed with respect to the longitudinal axis of the vehicle;
   (b) said inner end of said first tubular member being positioned at the second side of the vehicle with the outer end thereof being positioned at the first side of the vehicle;
   (c) a horizontally disposed and elongated second tubular member, having inner and outer ends, telescopically slidably mounted in said first tubular member and which is movable between retracted and extended positions with respect to said first tubular member;
   (d) a horizontally disposed and elongated third tubular member, having inner and outer ends, telescopically slidably mounted in said second tubular member and which is movable between retracted and extended positions with respect to said second tubular member;
   (e) said outer ends of said first, second and third tubular members being positioned at the first side of the vehicle when said first, second and third tubular members are in said retracted positions;
   (f) a vertically disposed and elongated fourth tubular member, having upper and lower ends, with said upper end thereof being secured to said outer end of said third tubular member;
   (g) a vertically disposed and elongated fifth tubular member, having upper and lower ends, telescopically slidably mounted in said fourth tubular member and which is movable between retracted and extended positions with respect to said fourth tubular member;
   (h) a vertically disposed and elongated sixth tubular member, having upper and lower ends, telescopically slidably mounted in said fifth tubular member and which is movable between retracted and extended positions with respect to said fifth tubular member;
   (i) a ground engaging pad secured to said lower end of said sixth tubular member;
   (j) and means for selectively moving said second, third, fifth and sixth tubular members between said retracted and extended positions.

2. The outrigger of claim 1 wherein a second outrigger assembly is mounted on the vehicle rearwardly of said forward end thereof at the second side thereof, said second outrigger assembly being identical to said first outrigger assembly.

3. The outrigger of claim 2 wherein a third outrigger assembly is mounted on the vehicle at the first side thereof rearwardly of said first outrigger assembly, said third outrigger assembly being identical to said first and second outrigger assemblies and wherein a fourth outrigger assembly is mounted on the vehicle at the second side thereof rearwardly of said second outrigger assembly, said fourth outrigger assembly being identical to said first, second and third outrigger assemblies.

4. The outrigger of claim 1 wherein said fifth and sixth tubular members are moved between said retracted and extended positions by hydraulic pressure.

5. The outrigger of claim 1 wherein said second and third tubular members are moved between said retracted and extended positions by a hydraulic cylinder.

\* \* \* \* \*